Figure 1:
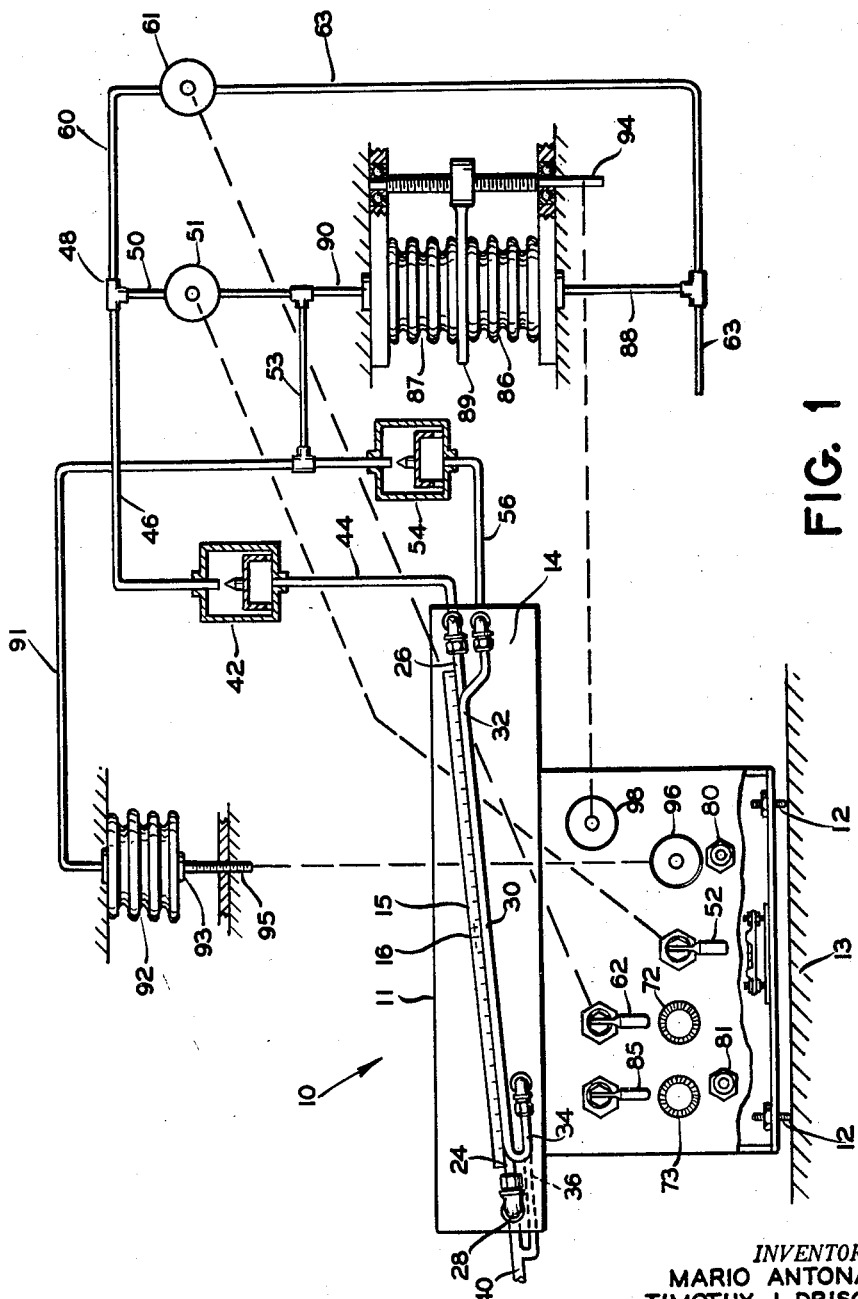

INVENTORS
MARIO ANTONAZZI
TIMOTHY J. DRISCOLL
BAIRD SNYDER
MARIAN WOLUJCZYK
BY Herbert L. Harris
ATTORNEY

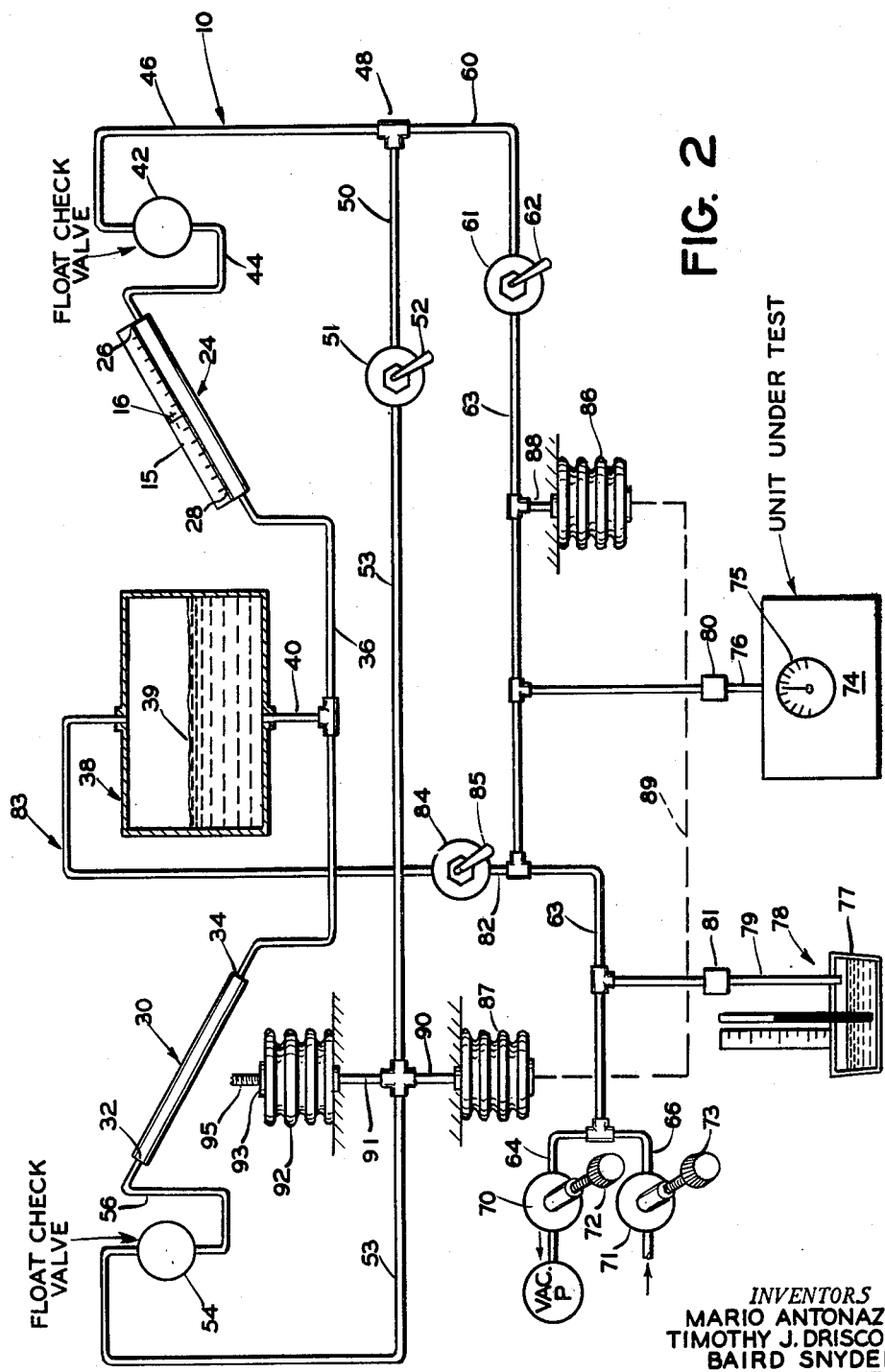

United States Patent Office 3,107,515
Patented Oct. 22, 1963

3,107,515
DOUBLE TUBE MANOMETER TO CALIBRATE
PRESSURE SENSING INSTRUMENTS
Mario Antonazzi, Oradell, Timothy J. Driscoll, Bergenfield, Baird Snyder, Maplewood, and Marian Wolujczyk, Livingston, N.J., assignors to The Bendix Corporation, Teterboro, N.J., a corporation of Delaware
Filed June 2, 1961, Ser. No. 114,479
12 Claims. (Cl. 73—4)

This invention relates to a precision adjustable double tube manometer particularly adapted to calibrate pressure sensing instruments and more particularly to an adjustable double slant tube manometer connected to a volume of reference liquid and embodying means for correcting said manometer for variations in the volume of said reference liquid and which is particularly adapted to precision calibrate altitude measuring devices.

In the past, inexpensive water or oil manometers which operate in conjunction with a volume of reference liquid have been used for calibrating altitude measuring devices. In such calibrating devices the slant tube manometer and the altitude measuring device are brought to a base altitude equivalent by an external measuring device. The reference volume of the slant tube manometer is then isolated. The fluid pressure to the unit under test and the upper end of the manometer is then changed to give a desired manometer reading. As so used, the manometer has an inherent error because the volume of the reference liquid is decreased when the liquid rises above zero in the manometer tube while the reference liquid is increased as the liquid falls below zero in the manometer tube. The change in the volume of the reference liquid causes a change in the reference liquid level and a corresponding change in the manometer reference pressure. Error is therefore introduced into the manometer.

In the past, the errors introduced into such manometer by changes in the reference liquid level have been minimized by confining the reference liquid in a reservoir which exposed a relatively large surface area of the reference liquid to the reference fluid pressure. By using such a reservoir, variations in the liquid level of the reference liquid are very small but the changes in the manometer reference volume and hence the reference pressure remain the same. Such devices have proved unsatisfactory for precision calibrating applications, because significant thermal effects result due to the large volume of reference gaseous medium and large surface area of the reference liquid. Such single tube manometers utilizing water or oil have the further limitation that a very large bulky device is required to measure pressure equivalents over the normal range of altitudes traversed even by conventional aircraft. For these reasons, calibrating slant single tube manometers have been constructed with small reference liquid volumes and calibrated against a mercury standard. In the small range inherent in such single slant tube manometers, calibration thereof is in the range of readability of the mercury standard in the order of 0.001" to 0.004" which is very difficult to read with great accuracy.

An object of the invention is to provide a calibrating device so arranged as to effect measurement of small increments of altitude pressure equivalents, such as are necessary in calibrating aircraft altitude measuring devices operating on the atmospheric pressure sensing principle and including an additional novel correcting tube so arranged that the operator of the calibrating device may effectively maintain the liquid level in the reference volume constant and eliminate the necessity of calibration against a mercury standard.

It is another object of the invention to provide a novel direct measurement calibrating double tube manometer used in conjunction with a volume of reference liquid and including means for correcting the manometer for variation in the volume of the reference liquid.

It is a further object of the invention to provide a direct measurement double slant tube manometer operated in conjunction with a reference liquid and including bellows means operable to compensate said manometer for variations in the liquid level of said reference liquid.

It is still a further object of the invention to provide a adjustable double slant tube manometer having a measuring tube and a correcting tube each connected at their lower ends to a volume of reference liquid together with novel means for varying the pressures applied to said reference liquid and to the upper end of said measuring tube as well as means for correcting the level of the liquid in said double slant tube manometer, and means for compensating said double slant tube manometer for variations in the volume of said reference liquid.

The foregoing and other objects and advantages of the invention will appear more fully hereinafter from a consideration of the detailed description which follows, taken together with the accompanying drawings wherein one embodiment of the invention is illustrated. It is to be expressly understood, however, that the drawings are for the purpose of illustration and description only, and are not to be construed as defining the limits of the invention.

In the drawings:

FIGURE 1 is a front view in elevation of the calibrating manometer of the instant invention with operating mechanism shown schematically; and FIGURE 2 is a schematic diagram of the fluid network of the calibrating manometer of FIGURE 1.

Referring now to the drawings there is shown therein the extremely accurate yet inexpensive direct measuring calibrating manometer 10 of the instant invention particularly adapted to calibrate pressure sensing devices such as altitude measuring devices in small increments of altitude pressure equivalents. Reference should be made to FIGURE 1 for the physical relationship of the components of the calibrating manometer 10 while reference should be made to FIGURE 2 for the fluid relationship of the components of the calibrating manometer 10.

As shown in FIGURE 1, the calibrating manometer 10 is comprised of a box type frame member 11 having adjustable leveling screws 12 projecting from the bottom thereof which support frame member 11 on support 13.

Frame 11 has a front face 14. The bottom portion of the front face 14 serves as a control panel from which the operative device projects. The top portion of the front face 14 is an elongated indicator panel to which is attached, by suitable operator-operative adjusting means, not shown, an indicator scale 15 which is inclined with respect to support base 13 and has a predetermined zero point 16.

A novel double slant tube manometer which is comprised of a measuring tube 24 having an upper end 26 and a lower end 28 and correction tube 30 having an upper end 32 and a lower end 34 is mounted on frame 11. The measuring tube 24 and the correction tube 30 have substantially the same internal diameter. A major straight portion of measuring tube 24 is disposed immediately adjacent indicator scale 15 and a major straight portion of correcting tube 30 extends in adjacent parallel relation to the straight portion of tube 24 and is disposed immediately in front of measuring tube 24 in the same plane therewith.

The lower ends 28 and 34 of the measuring tube 24 and correcting tube 30, respectively, are connected together by line 36 and to the bottom of a sealed liquid reservoir 38 by line 40. A volume of a reference liquid medium 39 such as oil or water may partially fill the reservoir 38.

The upper end 26 of measuring tube 24 connects to the bottom of a first float check valve 42 by a line 44. Line 46 connects float check valve 42 to T connection 48. T connection 48 connects line 46 to a line 50 which has an operator-operative shut-off valve 51 therein. The shut-off valve 51 is of a conventional type and has an operator-operative actuator 52 as shown in FIGURE 1, which projects from the front face 14 of frame 11. A line 53 leads from the shut-off valve 51 to the upper end of a float check valve 54. A line 56 connects the bottom of float check valve 54 to the upper end 32 of a correcting tube 30.

The T connection 48 further connects line 46 to a line 60 leading to a second shut-off or high manometer valve 61. High manometer valve 61 is of a conventional type of shut-off valve and has an operator-operative actuator 62 which projects from the front face 14 of frame 11.

A line 63, which may be properly called a manifold, continues from high manometer valve 61 and connects into parallel branch lines 64 and 66, respectively. Lines 64 and 66 have valves 70 and 71 therein of the forged needle valve type with plastic stem tips and which are provided with operator-operative knobs 72 and 73, respectively, which projects from the front face of frame 11. Valve 70 connects line 64 to a suitable source of vacuum such as a vacuum pump, and valve 71 connects line 66 to the atmosphere, upon manipulation of their respective operator-operative knobs 72 and 73. Line 63 is adapted to be connected to an altitude measuring instrument or unit under test 74 through line 76 and to a sealed mercury reservoir 77 of a barometer 78 through a line 79. The altitude measuring instrument or unit under test 74 may have a conventional altitude or pressure indicator dial 75.

There are further provided plug-in jacks 80 and 81 which connect at one end to line 63 and are mounted on the front face of frame 11. Lines 76 and 79 have a plug-in fitting and are adapted to provide plug-in connections to plug-in jacks 80 and 81, respectively, in a well-known manner. A line 82 connects line 63 to a third operator-operative shut-off or low manometer valve 84. Low manometer valve 84 is a conventional type of shut-off valve and has an operator-operative actuator 85 which projects from the front face of frame 11. A line 83 continues from the low manometer valve 84 and opens into the top of the sealed liquid reservoir 38 and above the level of the volume of the reference liquid medium 39 therein to complete the flow network.

Means for adjusting and correcting the calibrating device of the instant invention is provided in the form of adjustable mechanism including a pair of differentially arranged bellows 86 and 87 of equal size having an adjustable plate 89 mounted between adjacent ends of the bellows 86 and 87 to vary the relative capacity thereof. The other end of the bellows 86 is fixedly mounted and connected through a line 88 to line 63 while the other end of bellows 87 is fixedly mounted and connected through line 90 to line 53. An adjustable trim bellows 92 is adjustably supported at one end by a plate 93 and is fixedly mounted at the opposite end and connected through a line 91 to the line 53. Adjustable screw jacks 94 and 95, as shown in FIGURE 1, serve to position the plates 89 and 93 and are each provided with operator-operative adjusting knobs 98 and 96, respectively, which project from the front face of frame 11 so that the setting of the bellows 86 and 87, as well as the trim bellows 92 may be readily effected.

The reservoir 38 may be so arranged in relation to the double slant tube manometer 10 that upon partially filling the reservoir 38 with a liquid medium 39 such as water or oil the level of the surface area of the liquid medium subject to the fluid pressure applied to the reservoir 38 through the line 83 will be such as to bring the fluid levels in tubes 24 and 30 to an approximate predetermined zero point 16 on the scale 15 with the valves 51, 61, 84 and 71 open and valve 70 closed. The scale 15 may then be adjusted by suitable operator-operative means (not shown) to effect accurate alignment of scale zero point 16 with the liquid meniscus of tube 24. Thereafter the valve 84 is closed whereupon the volume of gaseous medium in the reservoir 38 above the liquid medium level 39 and the line 83 provides a reference fluid pressure volume.

The valve 51 is then closed as well as the valve 84 whereupon the levels of the liquid in the respective tubes 24 and 30 may be differentially varied by adjustment of the differential bellows 86 and 87 by the operator-operative knob 98 and screw jack 94. The level of the liquid in the corrective tube 30 relative to the level of the liquid in the measuring tube 24 may be more minutely varied by adjustment of the trim bellows 92 by the operator-operative knob 96 and screw jack 95 so as to expand or contract the trim bellows 92.

In the operation of the calibrating device 10 the altitude measuring instrument or unit under test 74 and a barometer 78 are connected to line 63. Initially the valves 51, 61, and 84 are opened and valves 70 and 71 are manipulated so as to give a desired base altitude pressure equivalent as measured on the barometer 78. This pressure equivalent is distributed equally to the tops of the liquid medium levels in reservoir 38 and tubes 24 and 30, hence these levels are practically equal and the menisci of the liquid medium in tubes 24 and 30 are at the zero mark 16 on scale 15.

After the base altitude pressure equivalent is reached and valves 71 and 70 are closed in the manipulation thereof to effect such condition, the manifold 63 is then isolated from external effects and the manometer is then ready to be used to calibrate the unit 74 under test in increments of altitude pressure equivalents. Valve 84 is then closed to isolate the reference volume of gaseous medium in reservoir 38 and thereafter valve 51 is closed to isolate upper end 32 of tube 30 from tube 24. Assume for the moment that in addition to the upper end 32 of correction tube 30 and the reservoir 38 being isolated from the system that the lower end 34 of correction tube 30 is also isolated from the system.

Assume further, for purposes of illustration, that the measuring tube 24 has a measuring range of pressures equivalent to an altitude change of 30 meters and that it is desired to calibrate the unit 74 under test at 30 meters altitude. If the bellows operator-operative knob 98 be then operated in an appropriate direction a vacuum would be applied to the upper end 26 of measuring tube 24 and the liquid would then rise therein until it reaches the 30 meter increment marking on the indicator scale 15 at which time the operator-operative knob 98 would be manipulated no further. Under such conditions, the liquid drawn into the measuring tube 24 would be supplied to the measuring tube 24 from the reservoir 38 and the volume of reference liquid 39 would be diminished with a corresponding inaccuracy being introduced into the system.

This inaccuracy is prevented in accordance with the instant invention, by maintaining the low end 34 of correction tube 30 at all times in fluid communication with the low end 28 of measuring tube 24 and reservoir 38. Further, a pair of adjustable differential bellows 86 and 87 are connected, respectively, to the high end 26 of the measuring tube 24 and the high end 32 of the correction tube 30, in such a manner that upon manipulation of the differential bellows operator-operative knob 98 a vacuum may be applied to the high end 26 of measuring tube 24 by expansion of bellows 86 and through lines 88, 63, 60, 46 and 44 and concomitantly pressure may be applied by contraction of bellows 87 and through lines 90, 53 and 56 to the high end 32 of correction tube 30 or vice versa, as the case may be.

Further, the pressure indicative of the simulated altitude change is sensed by the altitude measuring device 74 under test. Consequently, upon adjusting bellows 86 by expanding the same so as to subtract an increment of pressure from the upper end 26 of measuring tube 24 and adjusting bellows 87 simultaneously to contract the same so as to add an increment of pressure to the upper end 32 of correction tube 30 to simulate an increase in altitude the incremental amount of liquid which rises in measuring tube 24 has been supplied thereto from correction tube 30. It is important to remember at this point that the measuring tube 24 and the correcting tube 30 have substantially the same internal diameter and lie in the same plane. It follows from this relationship that the amount of liquid which is forced out of correction tube 30 is equal in volume to the amount of liquid drawn into measuring tube 24. The volume of the reference liquid 39 is therefore not depleted by the altitude change effected and accurate indication of the simulated altitude pressure equivalent is effected. This permits precise accurate calibration of the altitude measuring device 74.

Assume for purposes of illustration that the measuring tube 24 of the illustrated embodiment will not measure more than an altitude change of 30 meters and it is desired to calibrate the altitude measuring device 74 above 30 meters altitude. In addition to closing valves 84 and 51, as heretofore described, the high manometer valve 61 may then be closed by manipulation of the operator-operative control 62 to isolate the manifold 63 from the manometer. The unit 74 under test may then be exercised through base altitude changes measured on the external barometer 78 by manipulation of valves 70 and 71 and then brought to the original base altitude on its own indicator 75. When valve 61 is thereafter opened the error of the unit 74 under test may be readily determined.

Furthermore in order to guard against human error the float check valves 42 and 54 are provided to prevent the liquid medium in the reservoir 38 and tubes 24 and 30 from being forced through the system in the event the high manometer valve 61 is closed while valve 84 is open when the manifold 63 pressure is increased.

It will be appreciated by one skilled in the art that the new and novel double slant tube manometer calibrating instrument just described provides a unique, inexpensive compact means for directly measuring an altitude increment and precision calibrating a pressure sensing apparatus against said measurement. The calibrating instrument of the instant invention has the unique advantages of eliminating the need for calibrating against a mercury standard and eliminates the detrimental effects of variations in the volume of the reference liquid on the accuracy of the calibrating instrument.

Although but one embodiment of the invention has been illustrated and described in detail it is to be expressly understood that the invention is not limited thereto. Various changes can be made in the design and arrangement of the parts without departing from the spirit and the scope of the invention as the same will now be understood by those skilled in the art.

What is claimed is:

1. In a calibrating device, the combination comprising a double slant tube manometer including a measuring tube and a correction tube, said measuring tube and said correction tube being coextensive each of said tubes having an upper end and a lower end, said measuring tube and said correction tube each operatively connected together and to a volume of a reference liquid medium at the lower ends thereof whereby said reference liquid medium may provide an indicating level in said tubes varying in response to fluid pressures applied to the upper ends of said manometer tubes and said reference liquid medium, means for selectively varying the fluid pressures applied to said reference liquid medium and the upper end of said measuring tube, means for correcting the levels of the liquid medium in the measuring and correction tubes of said manometer, and means operatively adjustable to vary the fluid pressure applied to the upper end of said measuring tube and simultaneously vary the fluid pressure applied to the upper end of said correction tube inversely with respect thereto for compensating said manometer tubes for variations in the volume of said reference liquid medium.

2. The combination defined by claim 1 in which said correcting means includes an adjustable bellows means connected to the upper end of said correction tube and operative to selectively vary the amount of the fluid pressure applied thereto.

3. The combination defined by claim 1 in which said compensating means includes a pair of adjustable bellows, one of said bellows being connected to the upper end of said measuring tube and another of said bellows being connected to the upper end of said correction tube, said pair of bellows being operative upon adjustment to vary the fluid pressure applied to the upper end of said measuring tube and concomitantly vary the fluid pressure applied to the upper end of said correction tube inversely with respect thereto.

4. In a calibrating device, the combination comprising a double slant tube manometer having a measuring tube and a correction tube, each of said tubes being connected together and to a volume of a reference liquid at their lower ends, whereby said reference liquid rises a predetermined distance in said tubes in response to fluid pressures applied to upper ends of said tubes and said reference liquid, adjustable bellows correcting means effectively connected to upper end of said correction tube and operative to selectively vary the amount of fluid pressure applied thereto, and adjustable bellows means effectively connected to the upper ends of said measuring tube and said correction tube, said adjustable bellows means being operative to vary the fluid pressure applied to the upper end of said measuring tube and simultaneously to vary the fluid pressure applied to the upper end of said correction tube inversely with respect thereto so as to compensate said manometer for variations in the volume of said reference liquid.

5. In a double slant tube manometer, the combination comprising a measuring tube and a correction tube, each of said tubes having substantially the same internal diameter and being disposed in the same inclined plane relative to a horizontal plane, each of said tubes being connected together at their lower ends and to a common volume of fluid pressure to be sensed, adjustable means operatively connected to an upper end of said correction tube and an upper end of said measuring tube, and said adjustable means being operable so as to inversely vary fluid pressures applied to the upper ends of said tubes so as to thereby correct for variations in the levels of the reference liquid in said measuring and correction tubes.

6. In a device for calibrating pressure responsive instruments, the combination comprising a double slant tube manometer including a measuring tube and a correction tube each of said tubes being connected together and to a volume reference liquid at their lower ends, a source of fluid pressure, means connecting a pressure responsive instrument to be calibrated to the upper end of said measuring tube, adjustable means connected to the upper end of said measuring tube and to an upper end of said correction tube, said adjustable means being operative to selectively add increments of pressure to the upper end of one of said tubes while subtracting increments of pressure from the upper end of the other of said tubes so as to thereby inversely compensate said tubes for variations in the volume of said reference liquid whereby said pressure responsive means may be precision calibrated.

7. In a calibrating device, a double slant tube manometer means including a measuring tube and a correcting tube disposed in the same plane relative to a horizontal plane, a reservoir containing a reference liquid, means for supplying the reference liquid from the reservoir to the lower end of said measuring tube and to the lower end of said correcting tube, a source of fluid pressure connected to the upper end of said measuring tube whereby the reference liquid supplied to said measuring tube through said supplying means varies with the magnitude of the fluid pressure applied at the upper end of said measuring tube, and adjustable means connected to the upper end of said correcting tube and adapted to maintain the supply of said reference liquid to said measuring tube and correction tube constant.

8. A calibrating device comprising a double slant tube manometer having a measuring tube and a correction tube, each of said tubes having an upper end and a lower end and each of said tubes being oriented in the same inclined plane relative to a horizontal plane, a closed reservoir containing a volume of reference liquid, the lower ends of said measuring tube and said correction tube being connected together and to said reservoir below the liquid level of said reference liquid therein so as to provide the reference liquid at a level in each of said tubes, the upper ends of said measuring tube and said correction tube being connected respectively to a first and second float check valve, said first float check valve being connected to a T connection, said T connection being connected to the upper end of said correction tube through a first fluid conduit having a first operator-operative valve therein, said T connection being further connected to a second operator-operative valve, said second operator-operative valve being connected to a second fluid conduit, means connected to said second fluid conduit adapted to selectively vary fluid pressure therein, said second fluid conduit being connected by a third fluid conduit having a third operator-operative valve therein, said third fluid conduit being connected to said closed reservoir above the liquid level of the reference liquid therein, adjustable trim bellows means operatively connected to the upper end of said correction tube through said second float check valve to permit adjustment of the liquid level in said correction tube relative to the liquid level in said measuring tube, adjustable differential bellows means operatively connected to said second fluid conduit and to the upper end of said correction tube to vary fluid pressure in said second fluid conduit and concomitantly vary fluid pressure applied to the upper end of said correction tube inversely with respect thereto, pressure indicating means adapted to be connected to said second fluid conduit to sense the fluid pressure therein and other pressure measuring means adapted to be connected to said second fluid conduit for test purposes.

9. In a calibrating device, the combination comprising a measuring tube and a correcting tube, each of said tubes having substantially the same internal diameter and extending in adjacent parallel relation one to the other, indicator means disposed in cooperative relation to said tubes, said tubes each having an upper end and a lower end, said tubes each being operatively connected together and to a volume of a reference liquid medium at the lower ends thereof, and operator-operative means for inversely applying variable fluid pressures to the upper ends of said tubes and thereby to said reference liquid medium whereby an indicating level of said liquid medium may be effected in said tubes relative to said indicating means varying in position in response to said applied fluid pressures.

10. In a calibrating device, the combination comprising a measuring tube and a correcting tube, each of said tubes having substantially the same internal diameter and extending in adjacent parallel relation one to the other, indicator means disposed in cooperative relation to said tubes, said tubes each having an upper end and a lower end, said tubes each being operatively connected together and to a volume of a reference liquid medium at the lower ends thereof, first operator-operative means for applying variable fluid pressures to the upper ends of said tubes and to said reference liquid medium whereby an indicating level of said liquid medium may be effected in said tubes relative to said indicating means varying in position in response to said applied fluid pressures, and second operator-operative means for isolating said correction tube from said measuring tube so as to maintain the indicating level of the liquid medium in said correction tube at a constant fluid pressure indicating position relative to said indicator means while varying fluid pressure may be applied to the upper end of said measuring tube by said first operator-operative means to effect primary test measurements indicated by the level of the liquid medium in said measuring tube relative to said indicator means.

11. In a calibrating device, the combination comprising a measuring tube and a correcting tube, each of said tubes having substantially the same internal diameter and extending in adjacent parallel relation one to the other, indicator means disposed in cooperative relation to said tubes, said tubes each having an upper end and a lower end, said tubes each being operatively connected together and to a volume of a reference liquid medium at the lower ends thereof, first operator-operative means for applying variable fluid pressures to the upper ends of said tubes and to said reference liquid medium whereby an indicating level of said liquid medium may be effected in said tubes relative to said indicating means varying in position in response to said applied fluid pressures, and second operator-operative differential bellows means to simultaneously vary inversely the fluid pressures applied to the upper ends of said tubes to vary the position of the indicating levels of the liquid medium in said tubes relative to said indicator means.

12. In a calibrating device, the combination comprising a double slant tube manometer including a measuring tube and a correction tube, each of said tubes having substantially the same internal diameter and being disposed in the same inclined plane relative to a horizontal plane, each of said tubes extending in adjacent parallel relation one to the other, an indicator scale disposed immediately adjacent one side of the measuring tube and the correction tube being disposed immediately adjacent an opposite side of the measuring tube, said measuring tube and said correction tube each having an upper end and a lower end, said measuring tube and said correction tube each operatively connected together and to a volume of a reference liquid medium at the lower ends thereof, and operator-operative means for inversely applying variable fluid pressures to the upper ends of said tubes and thereby to said reference liquid medium whereby an indicating level of said liquid medium may be effected in said tubes relative to said indicator scale varying in position in response to said applied fluid pressures.

References Cited in the file of this patent
UNITED STATES PATENTS
2,562,494   Hejduk _____ July 31, 1951